US012605722B2

(12) United States Patent
Huang

(10) Patent No.: US 12,605,722 B2
(45) Date of Patent: Apr. 21, 2026

(54) GARDENING SPRAYER

(71) Applicant: Ting-Cheng Huang, Lukang Township, Changhua County (TW)

(72) Inventor: Ting-Cheng Huang, Lukang Township, Changhua County (TW)

( * ) Notice: Subject to any disclaimer, the term of this patent is extended or adjusted under 35 U.S.C. 154(b) by 538 days.

(21) Appl. No.: 18/140,570

(22) Filed: Apr. 27, 2023

(65) Prior Publication Data

US 2024/0359193 A1 Oct. 31, 2024

(51) Int. Cl.
*B05B 1/16* (2006.01)
*B05B 1/30* (2006.01)
*B05B 12/00* (2018.01)

(52) U.S. Cl.
CPC .......... *B05B 1/1654* (2013.01); *B05B 1/3026* (2013.01); *B05B 12/002* (2013.01)

(58) Field of Classification Search
CPC ....... B05B 1/16; B05B 1/1627; B05B 1/1645; B05B 1/1654; B05B 1/3026; B05B 12/002
USPC ................................ 239/391, 392, 394, 526
See application file for complete search history.

(56) References Cited

U.S. PATENT DOCUMENTS

| | | | | |
|---|---|---|---|---|
| 5,433,384 A * | 7/1995 | Chan | B05B 3/04 | 239/239 |
| 7,159,797 B1 * | 1/2007 | Lammers | B05B 1/12 | 239/394 |
| 2022/0134360 A1 * | 5/2022 | Lin | B05B 1/1645 | 239/562 |
| 2022/0226837 A1 * | 7/2022 | Chen | B05B 1/1654 | |
| 2025/0043552 A1 * | 2/2025 | Hofman | E03C 1/046 | |

* cited by examiner

*Primary Examiner* — Jason J Boeckmann

(57) ABSTRACT

A gardening sprayer has a main body, a switching knob, a control member, a stopping unit, a dividing member, and a spraying head. The main body has an entrance portion and an exit portion with an accepting notch; the accepting notch has a through aperture, a first positioning portion, and a second positioning portion at a bottom surface; the through aperture is connected to the entrance portion, a controlling chamber is disposed on a peripheral edge of the exit portion and the exit portion further has a through hole passing the controlling chamber, the spraying head has a plurality of outlet apertures with different shapes at a front end and a spraying aperture at a center position.

8 Claims, 8 Drawing Sheets

GARDENING SPRAYER

BACKGROUND OF INVENTION

Field of Invention

The present invention relates to a gardening sprayer.

Description of the Related Art

During gardening work, it is necessary to water the flowers and trees regularly to avoid the death of plants due to lack of water and dryness. Usually, the plants are planted in a wide range area or far away from the water source, so the watering process uses water hoses. But the water directly flowing out of the water hose has a stronger flow and small range, which makes it impossible to water a large area, and the watering process is slow. Therefore, it is necessary to install a water spray gun at the end of the water hose for use. The water spray gun can spray water in a large area to achieve more efficient and comprehensive irrigation. There is a sprinkler head on the conventional water spray gun, and several water outlet holes with different spray shapes are arranged around the front end of the sprinkler head, rotating the water spray head can achieve the effect of spraying water with different sprays.

However, the above-mentioned conventional structure still has the following problems in practical application: the conventional water spray gun can only spray water with the described water outlet holes around the front end of the sprinkler head but cannot make water from the center of the end face of the sprinkler head.

Therefore, it is desirable to provide a gardening sprayer to mitigate and/or obviate the aforementioned problems.

SUMMARY OF THE INVENTION

An objective of present invention is to provide a gardening sprayer which is capable of improving the above-mention problems.

In order to achieve the above mentioned objective, A gardening sprayer has a main body, a switching knob, a control member, a stopping unit, a dividing member, and a spraying head. The main body has an entrance portion and an exit portion with an accepting notch; the accepting notch has a through aperture, a first positioning portion, and a second positioning portion at a bottom surface; the through aperture is connected to the entrance portion, a controlling chamber is disposed on a peripheral edge of the exit portion and the exit portion further has a through hole passing the controlling chamber, the spraying head has a plurality of outlet apertures with different shapes at a front end and a spraying aperture at a center position.

Other objects, advantages, and novel features of invention will become more apparent from the following detailed description when taken in conjunction with the accompanying drawings.

DETAILED DESCRIPTION OF THE PREFERRED EMBODIMENT

Figure 1:
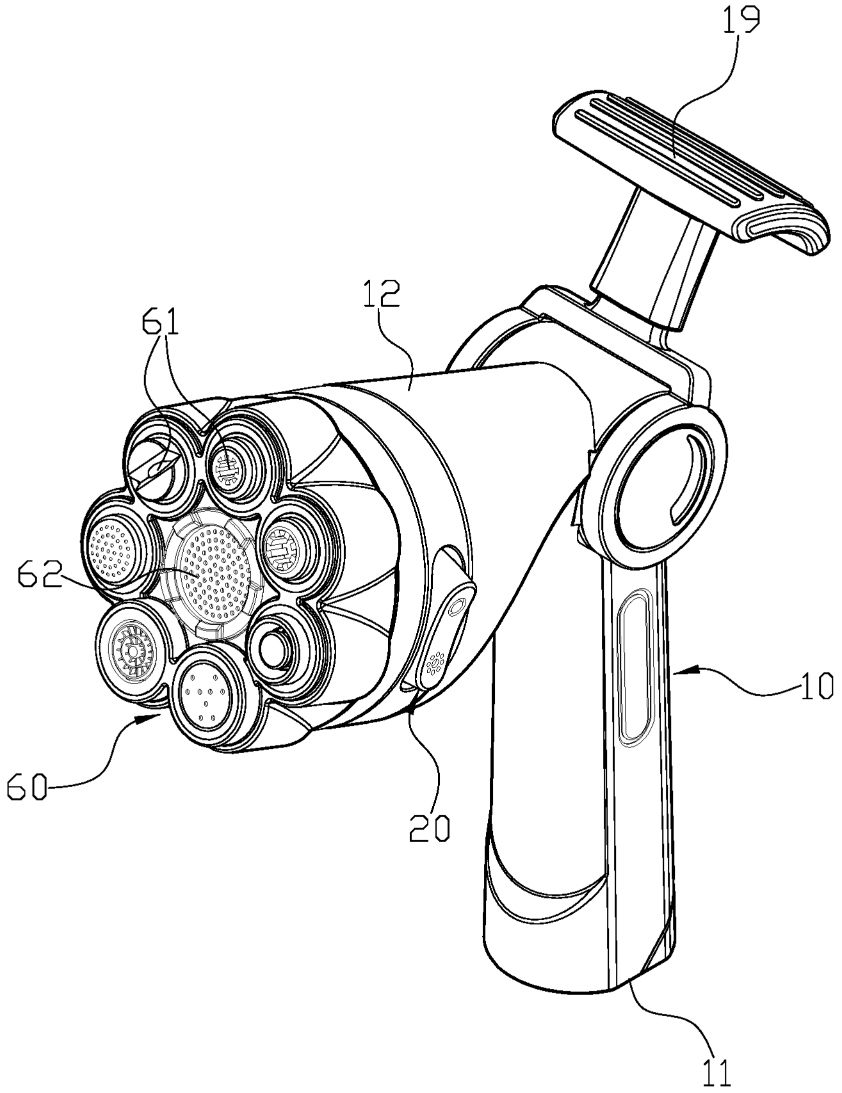
FIG. 1 is a three-dimensional combined view of a preferred embodiment according to the present invention.
Figure 2:
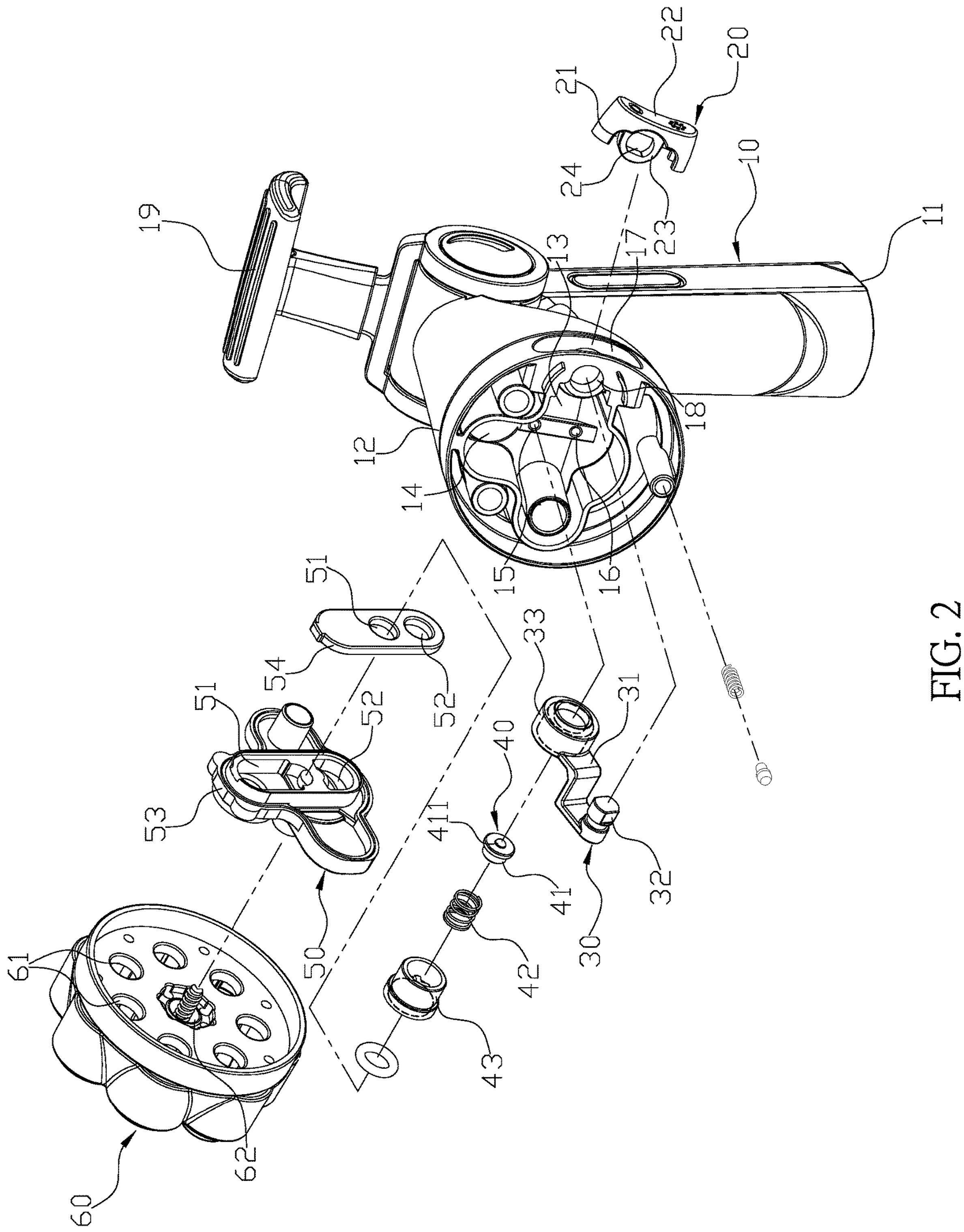
FIG. 2 is a three-dimensional exploded view of the preferred embodiment according to the present invention.
Figure 3:
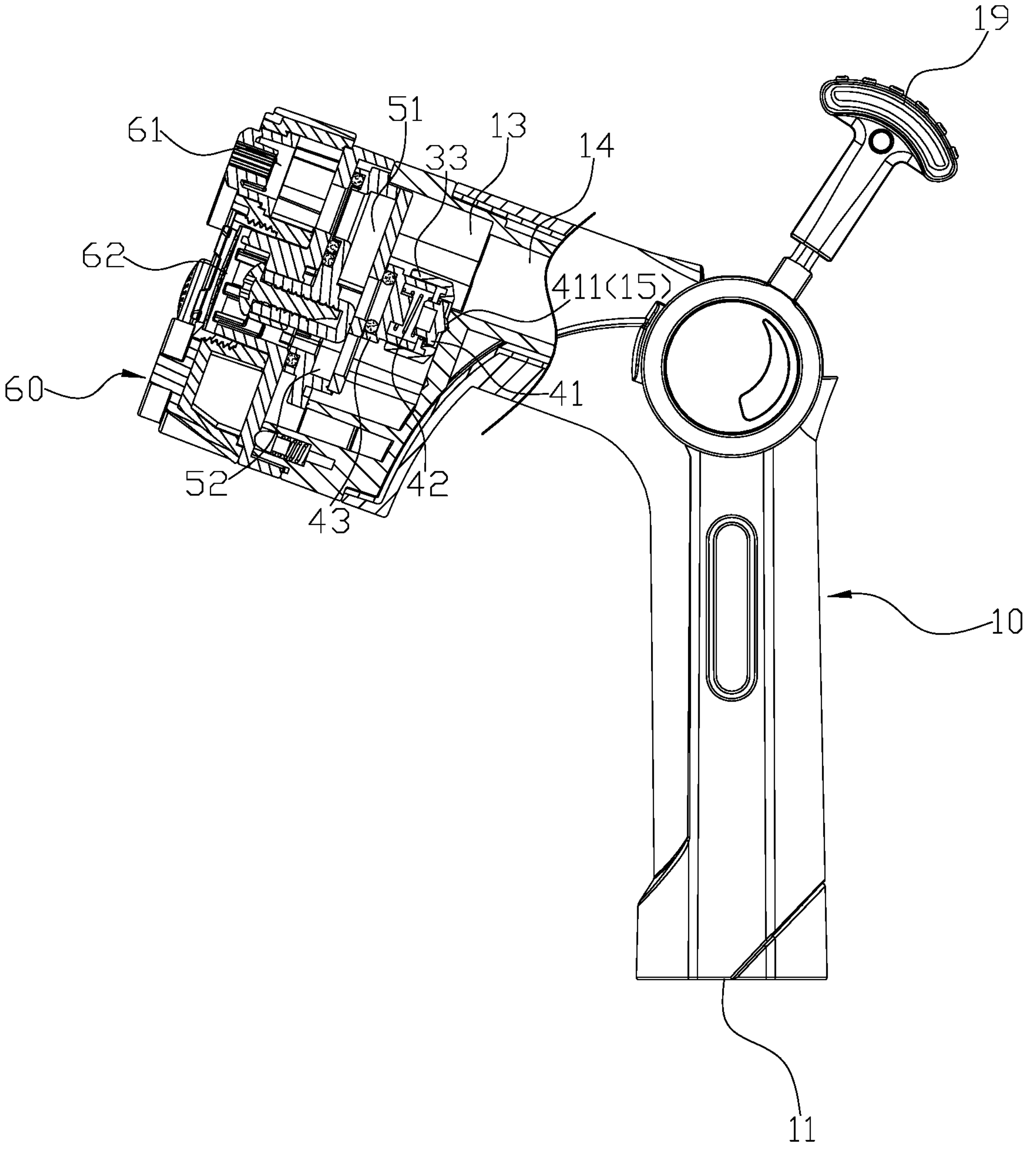
FIG. 3 is a cross-sectional view of the preferred embodiment according to the present invention.

First, please refer to FIG. 1-FIG. 3. A gardening sprayer comprises a main body 10, a switching knob 20, a control member 30, a stopping unit 40, a dividing member 50 and a spraying head 60. The main body 10 has an entrance portion 11 and an exit portion 12 with an accepting notch 13. The accepting notch 13 has a through aperture 14, a first positioning portion 15 and a second positioning portion 16 at a bottom surface. The through aperture 14 is connected to the entrance portion 11 to send water from the entrance portion 11 to the accepting notch 13, and a controlling chamber 17 is disposed on a peripheral edge of the exit portion 12. The exit portion 12 further has a through hole 18 passing the controlling chamber 17. The switching knob 20 has a recess 21 at an end and a pressing spot location 22 at another end. The recess 21 has a circular disk 23 with an engaging aperture 24. When the switching knob 20 is placed in the controlling chamber 17, the pressing location 22 protrudes from the exit portion 12 to align the engaging aperture 24 with the through hole 18 and swing the switching knob 20 due to the circular disk 23. The control member 30 has a crank 31 with two ends respectively connected to an engaging column 32 and a containment tube 33, the engaging column 32 is inserted into the engaging aperture 24 after entering into the through hole 18, such that the crank 31 and the containment tube 33 are capable of being driven by the switching knob 20 to swing in the accepting notch 13. The stopping unit 40 has a fastener 41, a spring 42 and a waterproof jacket 43 disposed in the containment tube 33, the fastener 41 has a third positioning portion 411 configured for coupling with the first positioning portion 15 or the second positioning portion 16 to position the containment tube 33 at the first positioning portion 15 or the second positioning portion 16, and the spring 42 pushes the waterproof jacket 43 outwardly for a sealing effect. The dividing member 50 is mounted in the accepting notch 13 and has a first output channel 51 and a second output channel 52 respectively passing through a front end and a rear end of the dividing member 50, with the stopping unit 40 being driven by the containment tube 33 to block the first output channel 51 or the second output channel 52. The spraying head 60 has a plurality of outlet apertures 61 with different shapes at a front end and a spraying aperture 62 at a center position, the spraying head 60 is attached in front of the exit portion 12, and one of the outlet apertures 61 and the spraying aperture 62 are respectively connected to the first output channel 51 and the second output channel 52 of the dividing member 50.

Furthermore, the main body 10 has a handle connected to the entrance portion 11 at one end, and the exit portion 12 is a connecting tube connected to the handle.

In addition, the through aperture 14, the first positioning portion 15 and the second positioning portion 16 are arranged from top to bottom of the accepting notch.

Moreover, a protruding strip is disposed between the first positioning portion 15 and the second positioning portion 16, and the protruding strip is configured for positioning the fastener 41.

Also, the first positioning portion 15 and the second positioning portion 16 are both a groove, and the third positioning portion 411 is a protrusion.

Additionally, the main body 10 has a pull water valve 19 for controlling water output.

More, the dividing member 50 comprises a front base 53 and a rear cover 54 which are respectively configured for accepting the first output channel 51 and the second output channel 52.

Furthermore, the front base 53 and the rear cover 54 are aligned with each other and combined by an ultrasonic welding process.

Also, the spraying head 60 is screwed onto the dividing member 50 to be installed on the exit portion 12.

The gardening sprayer as claimed in claim 1, wherein a sealing ring is respectively installed between the spraying head 60 and the dividing member 50, and also between the dividing member 50 and the waterproof jacket 43.

Figure 4:
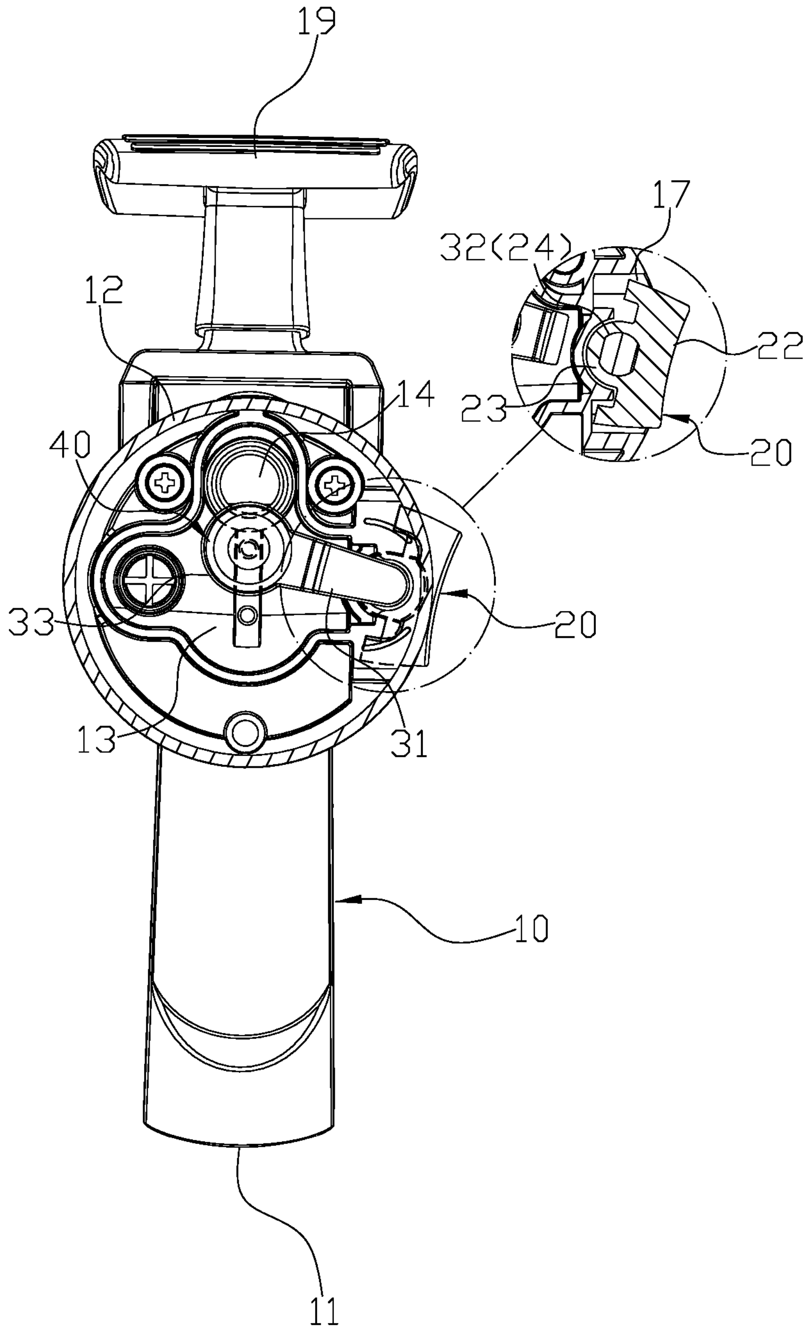
FIG. 4 is showing the switching button is pressed in one direction according to the present invention.
Figure 5:
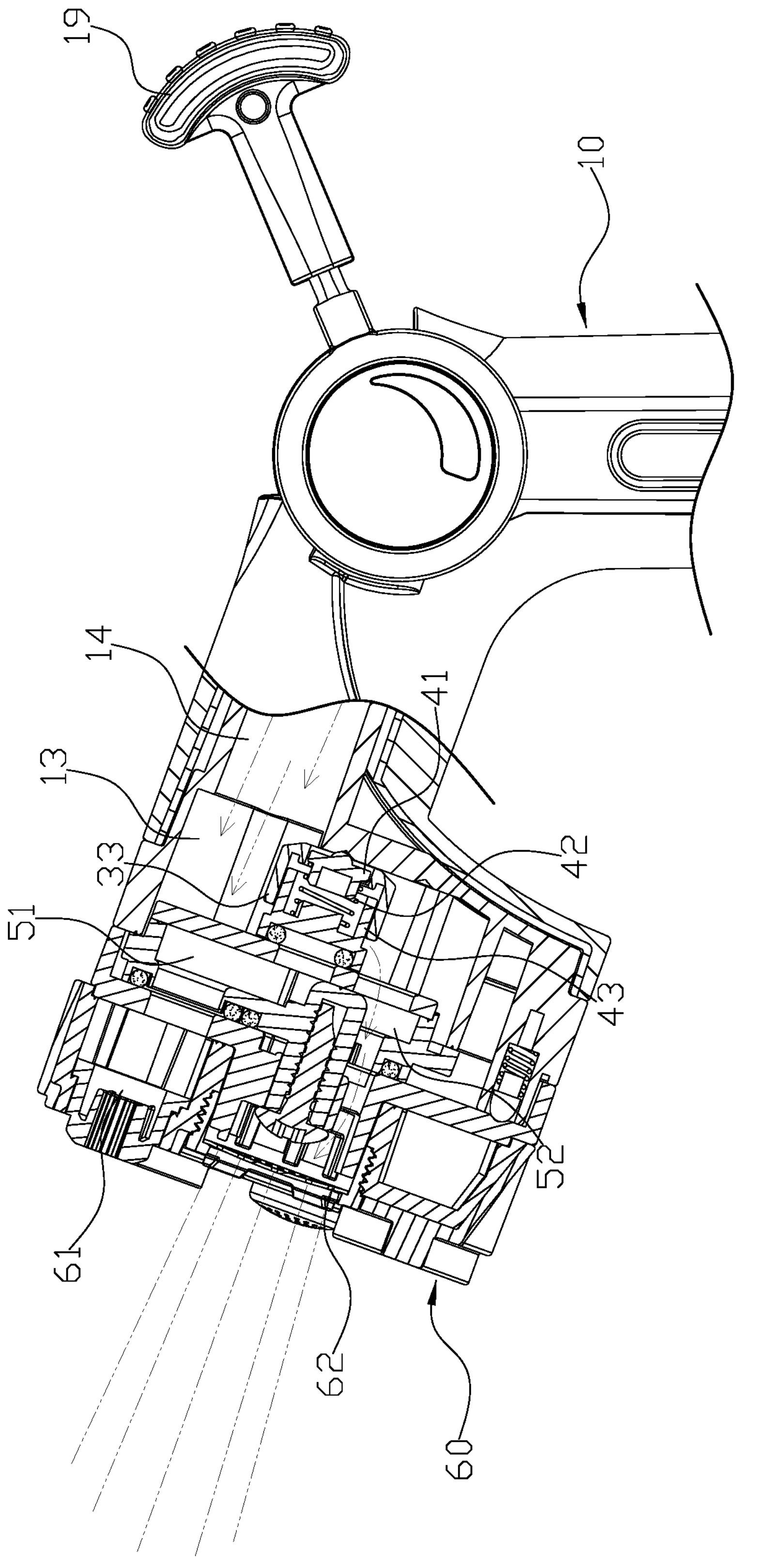
FIG. 5 is showing the water outlet in the center according to the present invention.
Figure 6:
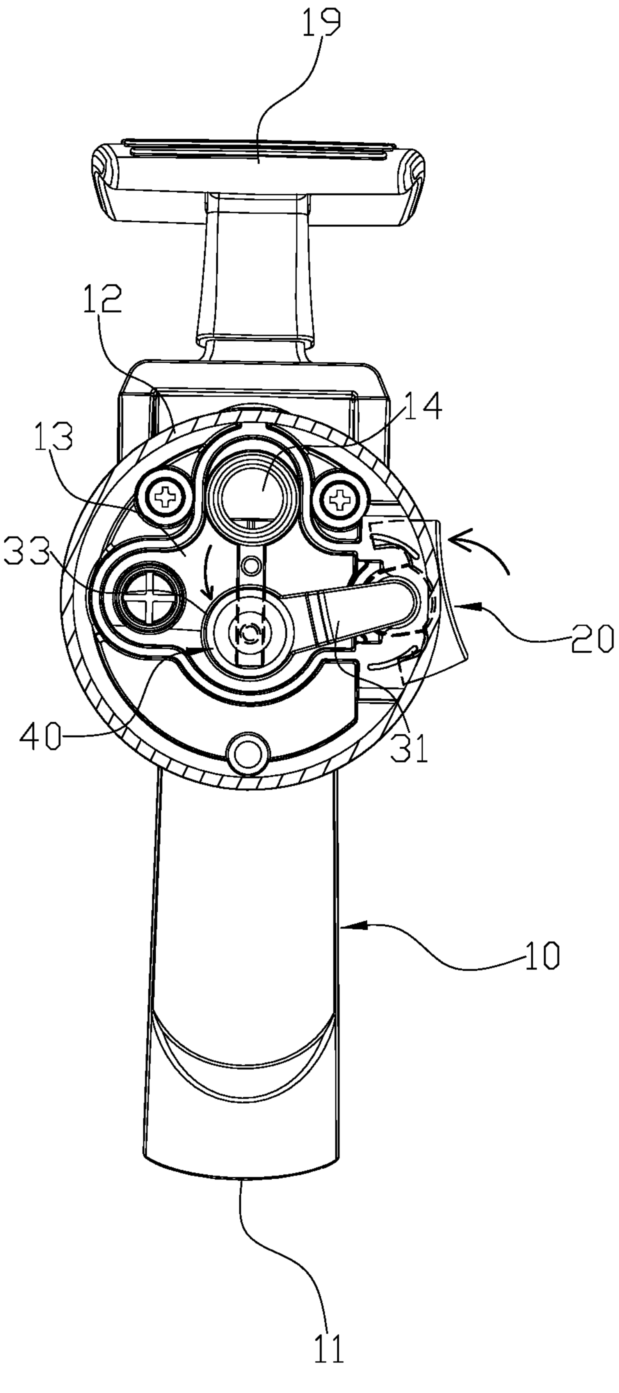
FIG. 6 is showing the switching button is pushed to another direction according to the present invention.
Figure 7:
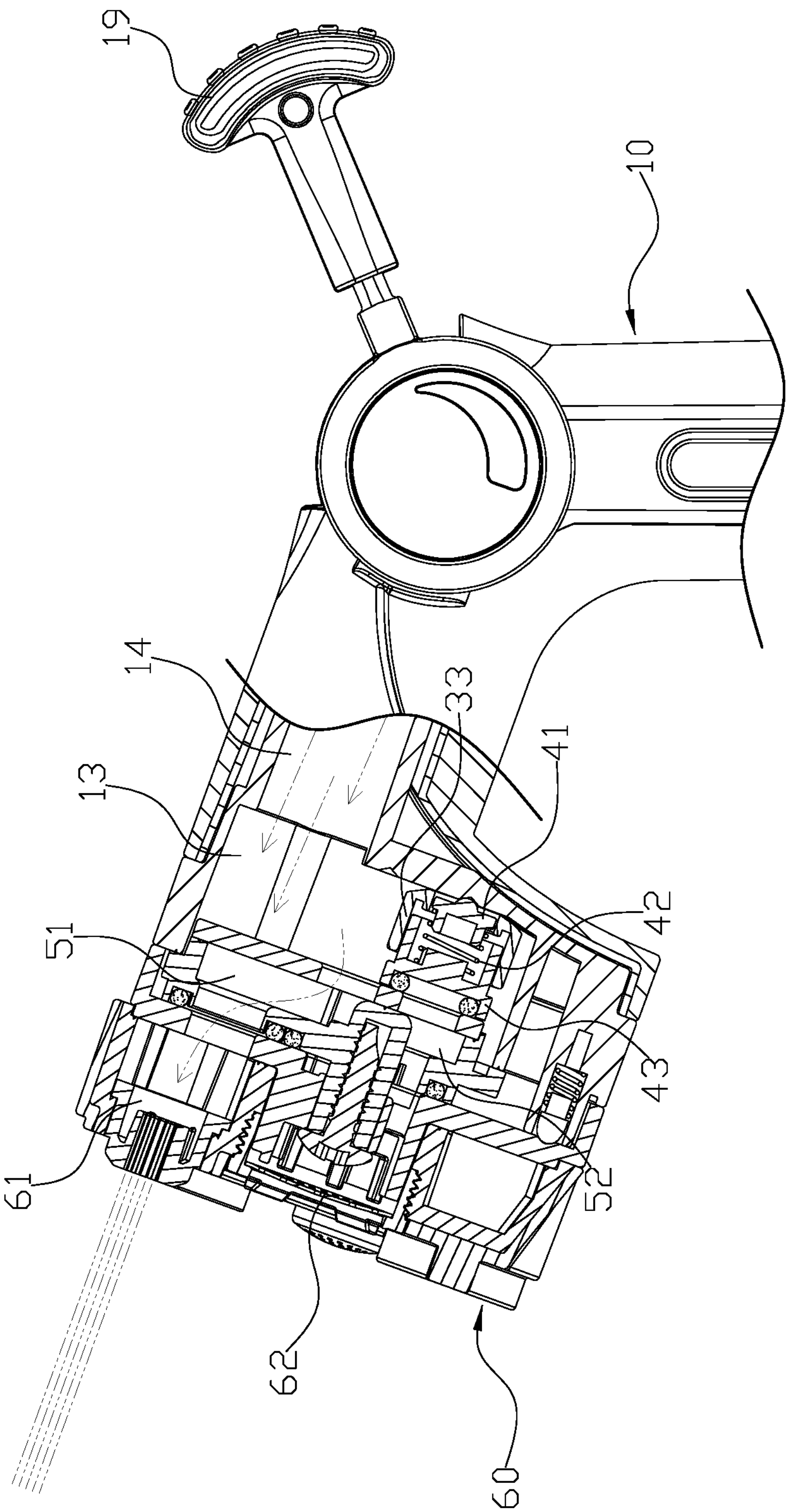
FIG. 7 is showing the water flowing out according to the present invention.
Figure 8:
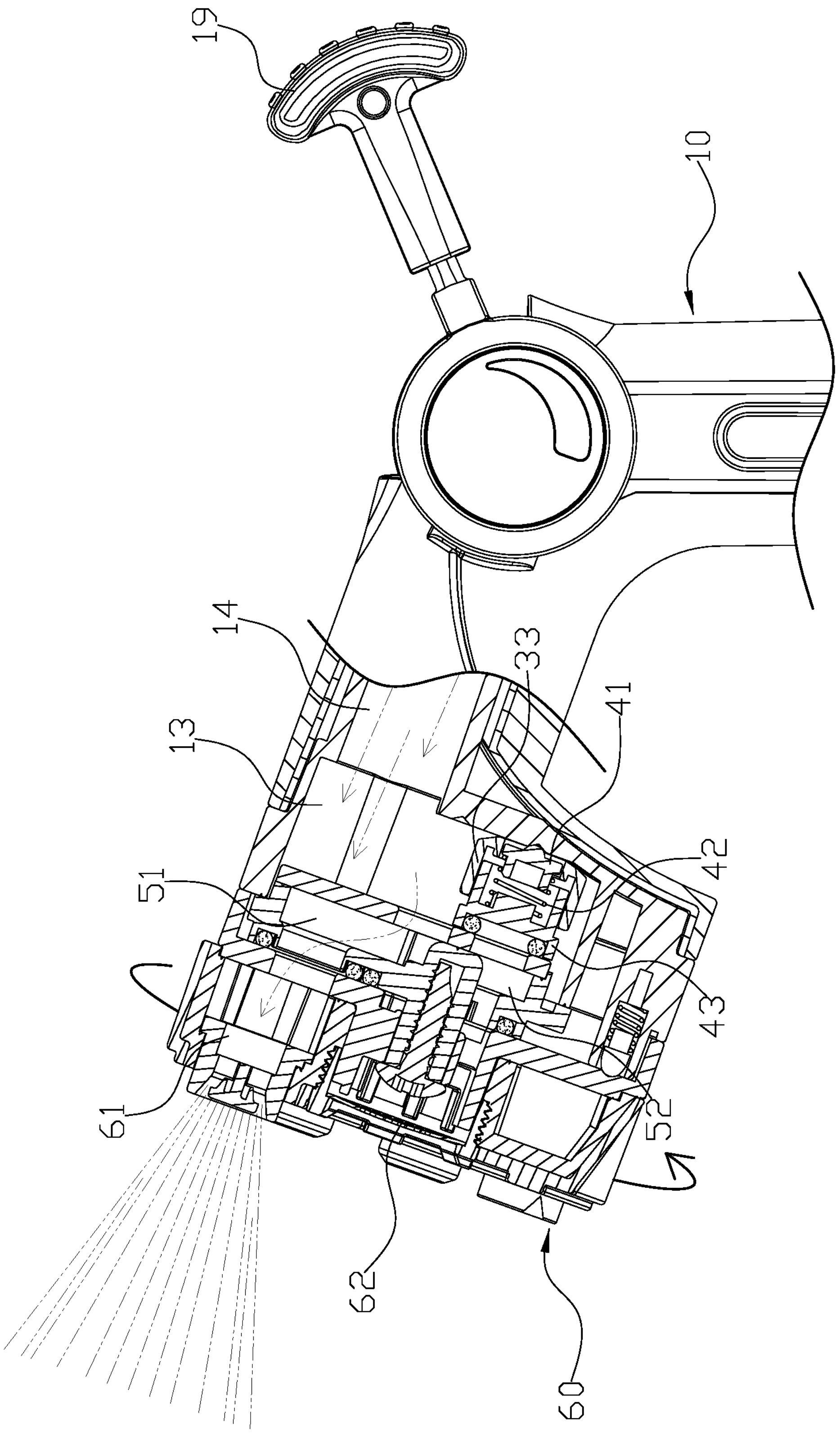
FIG. 8 is showing the shape of the water output being changed according to the present invention.

For actual application, the switching knob 20 is pushed to one direction to move the control member 30 to block the first output channel 51 with the waterproof jacket 43 so that water input sent into the accepting notch 13 can only be transferred into the second output channel 52, and then sprayed from the spraying aperture 62 at the center of the spraying head 60 as shown in FIG. 4 and FIG. 5. On the contrary, when the switching knob 20 is pushed to the opposite direction, the waterproof jacket 43 blocks the second output channel 52, so that the water input sent to the accepting notch 13 can only pass through the first output channel 51, and then spray from an outlet aperture 61 around the spraying head 60 as shown in FIG. 6 and FIG. 7. Furthermore, by rotating the spraying head 60, the shape of the spray can be changed, as shown in FIG. 8.

With the structure of the above-mentioned specific embodiment, the following benefits can be obtained: the water spray gun is capable of providing central water outlet and peripheral water outlet at the same time, so there are more water outlet selections that can be switched, and it better meets the needs of different consumers.

Although the present invention has been explained in relation to its preferred embodiment, it is to be understood that many other possible modifications and variations can be made without departing from the spirit and scope of invention as hereinafter claimed.

What is claimed is:

1. A gardening sprayer comprising: a main body, a switching knob, a control member, a stopping unit, a dividing member, and a spraying head; wherein:

the main body has an entrance portion and an exit portion with an accepting notch; the accepting notch has a through aperture, a first positioning portion, and a second positioning portion at a bottom surface; the through aperture is connected to the entrance portion, a controlling chamber is disposed on a peripheral edge of the exit portion and the exit portion further has a through hole passing the controlling chamber;

the switching knob has a recess at an end and a pressing spot location at another end, the recess has a circular disk with an engaging aperture; when the switching knob is placed in the controlling chamber, the pressing location protrudes from the exit portion to align the engaging aperture with the through hole and swing the switching knob;

the control member has a crank with two ends respectively connected to an engaging column and a containment tube, the engaging column is inserted into the engaging aperture after entering into the through hole, such that the crank and the containment tube are capable of being driven by the switching knob to swing in the accepting notch;

the stopping unit has a fastener, a spring, and a waterproof jacket disposed in the containment tube, the fastener has a third positioning portion configured for coupling with the first positioning portion or the second positioning portion to position the containment tube at the first positioning portion or the second positioning portion, and the spring pushes the waterproof jacket outwardly for a sealing effect;

the dividing member is mounted in the accepting notch and has a first output channel and a second output channel respectively passing through a front end and a rear end of the dividing member, with the stopping unit is driven by the containment tube to block the first output channel or the second output channel; and the spraying head has a plurality of outlet apertures with different shapes at a front end and a spraying aperture at a center position, the spraying head is attached in front of the exit portion, and one of the outlet apertures and the spraying aperture are respectively connected to the first output channel and the second output channel of the dividing member.

2. The gardening sprayer as claimed in claim 1, wherein the main body has a handle connected to the entrance portion at one end, and the exit portion is a connecting tube connected to the handle.

3. The gardening sprayer as claimed in claim 1, wherein the through aperture, the first positioning portion, and the second positioning portion are arranged from top to bottom of the accepting notch.

4. The gardening sprayer as claimed in claim 1, wherein the first positioning portion and the second positioning portion are both a groove, and the third positioning portion is a protrusion.

5. The gardening sprayer as claimed in claim 1, wherein the main body has a pull water valve.

6. The gardening sprayer as claimed in claim 1, wherein the dividing member comprises a front base and a rear cover which are respectively configured for accepting the first output channel and the second output channel.

7. The gardening sprayer as claimed in claim 6, wherein the front base and the rear cover are aligned with each other and combined by an ultrasonic welding process.

8. The gardening sprayer as claimed in claim 1, wherein a sealing ring is respectively installed between the spraying head and the dividing member, and also between the dividing member and the waterproof jacket.

* * * * *